(12) United States Patent
Johnson et al.

(10) Patent No.: US 8,718,699 B2
(45) Date of Patent: May 6, 2014

(54) WIRELESS COMMUNICATION SYSTEM HAVING ASSIGNED ACCESS CLASSES AND RELATED METHODS

(75) Inventors: Reid Henry Johnson, Portsmouth, NH (US); Gregory Newell Henderson, Sudbury, MA (US)

(73) Assignee: Harris Corporation, Melbourne, FL (US)

( * ) Notice: Subject to any disclaimer, the term of this patent is extended or adjusted under 35 U.S.C. 154(b) by 177 days.

(21) Appl. No.: 13/367,034

(22) Filed: Feb. 6, 2012

(65) Prior Publication Data

US 2013/0203460 A1  Aug. 8, 2013

(51) Int. Cl.
*H04B 7/00* (2006.01)

(52) U.S. Cl.
USPC ..... 455/525; 455/67.11; 455/436; 455/435.1; 455/435.2; 455/434

(58) Field of Classification Search
CPC ...................................................... H04B 7/022
USPC ......... 455/525, 67.11, 436, 435.1, 435.2, 434
See application file for complete search history.

(56) References Cited

U.S. PATENT DOCUMENTS

| | | | |
|---|---|---|---|
| 8,000,273 B2 | 8/2011 | He et al. ......................... | 370/280 |
| 8,001,375 B2 | 8/2011 | Hattori et al. .................. | 713/165 |
| 8,412,190 B1 * | 4/2013 | Moisanen et al. ............. | 455/434 |
| 8,583,120 B2 * | 11/2013 | Gong et al. ..................... | 455/436 |
| 2008/0200146 A1 | 8/2008 | Wang et al. .................... | 455/410 |
| 2008/0225785 A1 | 9/2008 | Wang et al. .................... | 370/329 |
| 2010/0197294 A1 | 8/2010 | Fox et al. .................... | 455/422.1 |
| 2011/0058480 A1 | 3/2011 | Dahlen .......................... | 370/237 |
| 2011/0199905 A1 | 8/2011 | Pinheiro et al. ............... | 370/235 |
| 2011/0201307 A1 | 8/2011 | Segura .......................... | 455/411 |
| 2011/0244907 A1 | 10/2011 | Golaup et al. ................ | 455/509 |
| 2012/0322386 A1 * | 12/2012 | Yi et al. ..................... | 455/67.11 |

FOREIGN PATENT DOCUMENTS

| | | |
|---|---|---|
| GB | 2465192 | 5/2010 |
| WO | 2010093949 | 8/2010 |

OTHER PUBLICATIONS

"3$^{rd}$ Generation Partnership Project; Technical Specification Group Services and System Aspects; Service Accessibility," 3GPP TS 22.011, V8.9.0 (Sep. 2009), pp. 1-26.
"Priority, Pre-emption, QoS," Public Safety Communications Research (PSCR), Department of Commerce—Boulder Labs, created Apr. 20, 2010; pp. 1-17.

* cited by examiner

*Primary Examiner* — Sanh Phu
(74) *Attorney, Agent, or Firm* — Allen, Dyer, Doppelt, Milbrath & Gilchrist, P.A.

(57) ABSTRACT

A wireless communication system includes a private LTE base station, a commercial carrier LTE base station, and a mobile wireless communications device. The mobile wireless communications device includes an LTE transceiver, a memory, and a controller coupled to the LTE transceiver and the memory. The controller stores an assigned AC value in the memory based upon a priority of use characteristic value, stores a random AC value in the memory, and determines whether access is available to the private LTE base station or the commercial carrier LTE base station. When the private LTE base station is available for access, a connection is made based upon the assigned AC value and a private LTE barring value received from the private LTE base station. When the commercial carrier LTE base station is available for access, a connection is made based upon the random AC value and a commercial carrier barring value.

27 Claims, 4 Drawing Sheets

FIG. 4

ACCESS CLASSES 11-15
- CLASS 15 - PLMN STAFF
- CLASS 14 - EMERGENCY SERVICES
- CLASS 13 - PUBLIC UTILITIES
- CLASS 12 - SECURITY SERVICES
- CLASS 11 - PLMN USE

ACCESS CLASSES 0-9 (PRIORITIZED BASED UPON USER)

| Class | Description |
|---|---|
| AC9 | LOW LEVEL UTILITY |
| AC8 | MED. LEVEL UTILITY |
| AC7 | HIGH LEVEL UTILITY |
| AC6 | FUTURE EXPANSION |
| AC5 | HOSPITAL STAFF |
| AC4 | FIRE PREVENTION |
| AC3 | MUNICIPAL CC |
| AC2 | EMS |
| AC1 | LAW ENFORCEMENT |
| AC0 | FIRST RESPONDER |

95

WIRELESS COMMUNICATION SYSTEM HAVING ASSIGNED ACCESS CLASSES AND RELATED METHODS

FIELD OF THE INVENTION

The present invention relates to the field of wireless communications, and, more particularly, to a long term evolution wireless communication system and related methods.

BACKGROUND OF THE INVENTION

A typical wireless communications system comprises a plurality of wireless communications devices exchanging data with each other. In some wireless communications systems, for example, infrastructure networks, the system may further comprise a wireless base station for managing communications between the wireless communications devices. In other words, each intra-system communication would be exchanged via the wireless base station. In other wireless communications systems, for example, mesh networks and ad hoc wireless networks, the wireless base station may be omitted, i.e. the wireless communications devices may communicate directly with each other.

The wireless communications devices may communicate with each other based upon a wireless communications protocol. The 3rd Generation Partnership Project Long Term Evolution (3GPP LTE) wireless communications protocol is a robust technology aimed at providing metropolitan area networks, as disclosed in the 3GPP TS 22.011 V8.9.0 (2009-09) Technical Specification, which is hereby incorporated by reference in its entirety. In particular, the LTE wireless protocol is commonly referred to as the fourth generation cellular protocol.

The LTE wireless communications protocol may provide for: increased bandwidth, low latency, and increased signal penetration. Moreover, the LTE wireless communications protocol provides an entirely packet switched protocol for both voice and data, and a simplified infrastructure that is easily integrated into legacy systems.

One potential drawback to the LTE wireless communications protocol may comprise sub-par performance in network sectors that are experiencing high user density, for example, during large events, such as sports events at large capacity stadiums. During these situations, the network throughput may be reduced significantly, effectively rendering the wireless communication system inoperative.

One approach to this drawback is included in the LTE wireless communications protocol, this approach comprising the barring factor feature. In the LTE wireless communications protocol, each mobile wireless communications device has an access class associated with it, the access classes including 0-15. In the LTE wireless communication system, access classes 11-15 are reserved for special users, i.e. Class 15—PLMN Staff; Class 14—Emergency Services; Class 13—Public Utilities (e.g. water/gas suppliers); Class 12—Security Services; and Class 11—PLMN Use.

When a wireless communications device connects to a wireless network, the device is randomly assigned a class from 0-9. During situations where the LTE wireless communication system may need to throttle usage, the network operator may access the barring factor feature. When the wireless communications device first connects to the wireless communication system, the device receives the standing barring rate (when the base station is operating in barring mode) and the device generates a random number. If the random number is less than the barring rate, the device continues to connect to the network. Otherwise, the device terminates the connection process to the LTE wireless communication system. A drawback to this approach is that since the mobile wireless communications device is barred based upon the randomly generated number, the barring rate is consequently applied randomly without any consideration to the actual priority of the user.

Another approach to priority in an LTE wireless communication system is disclosed in U.S. Patent Application Publication No. 2008/0200146 to Wang et al. Wang et al. uses the 11-15 access classes to provide priority similar to that of the typical LTE wireless communication system with special provisioning to make emergency calls.

SUMMARY OF THE INVENTION

In view of the foregoing background, it is therefore an object of the present invention to provide an LTE wireless communication system that can address high use applications.

This and other objects, features, and advantages in accordance with the present invention are provided by an LTE wireless communication system comprising a private LTE base station, a commercial carrier LTE base station, and a mobile wireless communications device comprising an LTE transceiver, a memory, and a controller coupled to the LTE transceiver and the memory. The controller is configured to store an assigned access class (AC) value in the memory based upon a priority of use characteristic value, store a random AC value in the memory, and determine whether access is available to the private LTE base station or the commercial carrier LTE base station. When the private LTE base station is available for access, then the wireless communication device will connect thereto based upon the assigned AC value and a private LTE barring value received from the private LTE base station, and when the commercial carrier LTE base station is available for access, then connect thereto based upon the random AC value and a commercial carrier barring value received from the commercial carrier LTE base station. Advantageously, the mobile wireless communications device may operate in both standard LTE wireless communication systems and in privatized special priority LTE communication systems.

More specifically, the controller may be configured to generate a comparative barring rate based upon one of the assigned AC value and the random AC value, and compare the comparative barring rate with one of the private LTE barring value and the commercial carrier barring value. The controller may be configured to stop connecting to the private LTE base station when the comparative barring rate is greater than or equal to the respective private LTE barring value. The controller may be further configured to stop connecting to the commercial carrier LTE base station when the comparative barring rate is greater than or equal to the commercial carrier barring value. The controller may be configured to restart connecting to the private LTE base station or the commercial carrier LTE base station after a barring time value has expired.

Another aspect is directed to a method of operating an LTE mobile wireless communications device. The method includes storing an assigned AC value in a memory of the LTE mobile wireless communication device based upon a priority of use characteristic value, storing a random AC value in the memory, and determining whether access is available to a private LTE base station or a commercial carrier LTE base station. The method also includes when the private LTE base station is available for access, then connecting thereto based upon the assigned AC value and a private LTE barring value received from the private LTE base station, and when the commercial carrier LTE base station is available for access, then connecting thereto based upon the random AC value and a commercial carrier barring value received from the commercial carrier LTE base station.

BRIEF DESCRIPTION OF THE DRAWINGS

FIG. 4 is a schematic diagram of prioritized ACs in the LTE wireless communication system of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
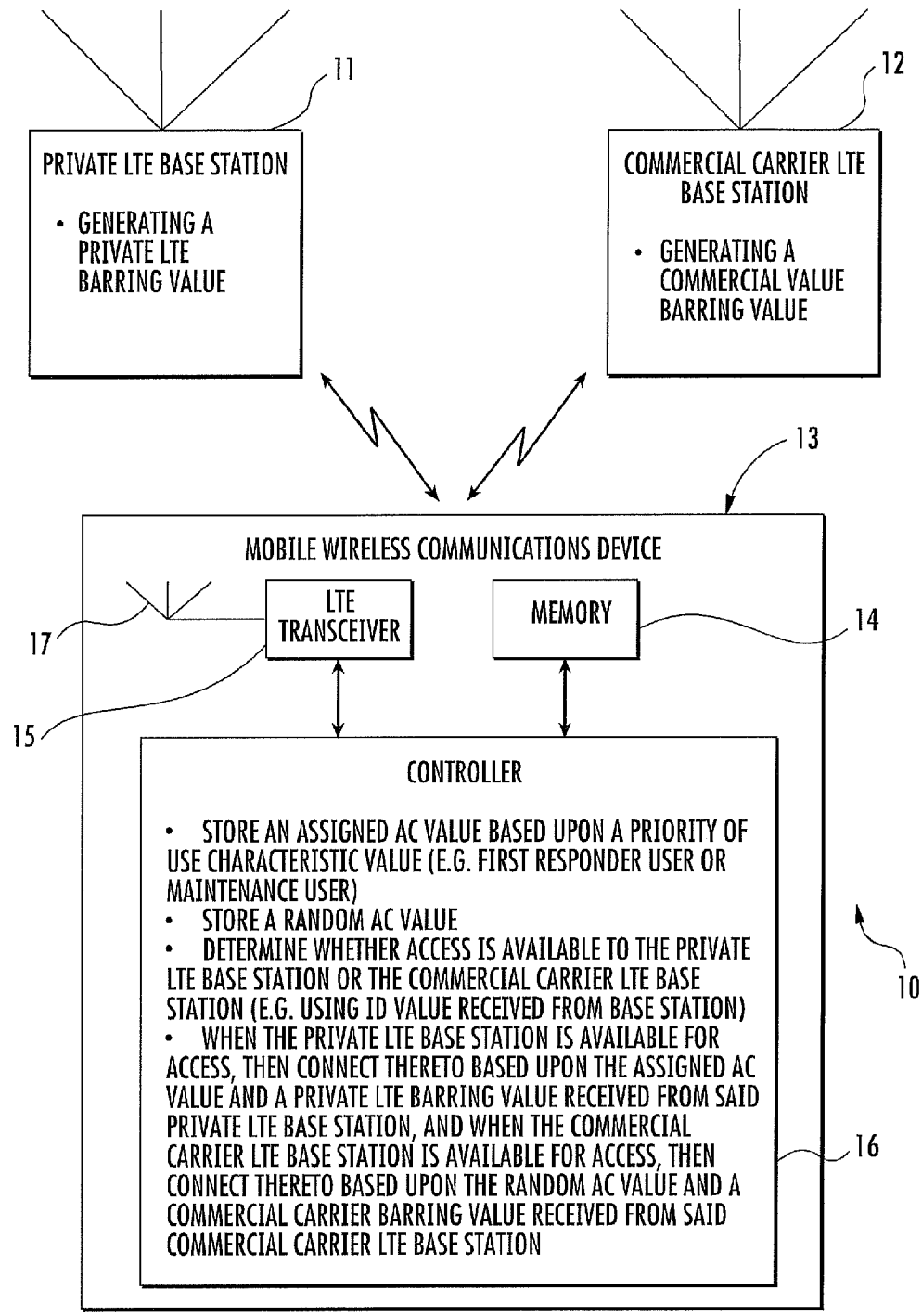
FIG. 1 is a schematic diagram of an LTE wireless communication system, according to the present invention.

Referring initially to FIG. 1, an LTE wireless communication system 10 according to the present invention is now described. The LTE wireless communication system 10 includes a private LTE base station 11 (FIG. 2: Public Safety PLMN), and a commercial carrier LTE base station 12. The commercial carrier LTE base station 12 is part of a commercial carrier cellular network, such as a Global System for Mobile Communications (GSM) or a code division multiple access (CDMA) cellular network (e.g. as provided by the Verizon Wireless or ATT Wireless networks).

The LTE wireless communication system 10 includes a mobile wireless communications device 13 comprising an LTE transceiver 15, an antenna 17 coupled to the LTE transceiver, a memory 14, and a controller 16 coupled to the LTE transceiver and the memory. For example, the controller 16 may comprise an integrated circuit (IC) microprocessor, such as a dual core Tegra processor, as available from the NVIDIA Corporation of Santa Clara, Calif., or may comprise a software module.

Figure 2:
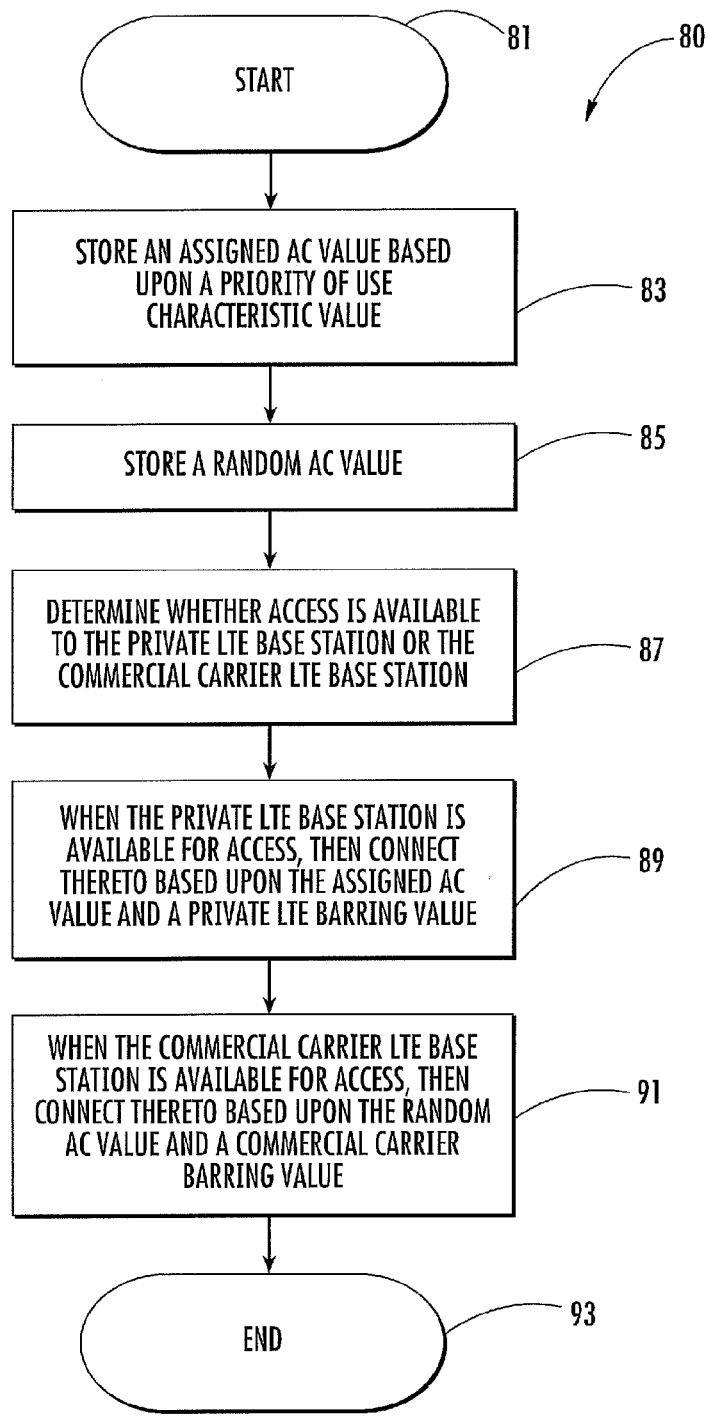
FIG. 2 is a flowchart illustrating operation of a mobile wireless communications device from the system of FIG. 1.
Figure 3:
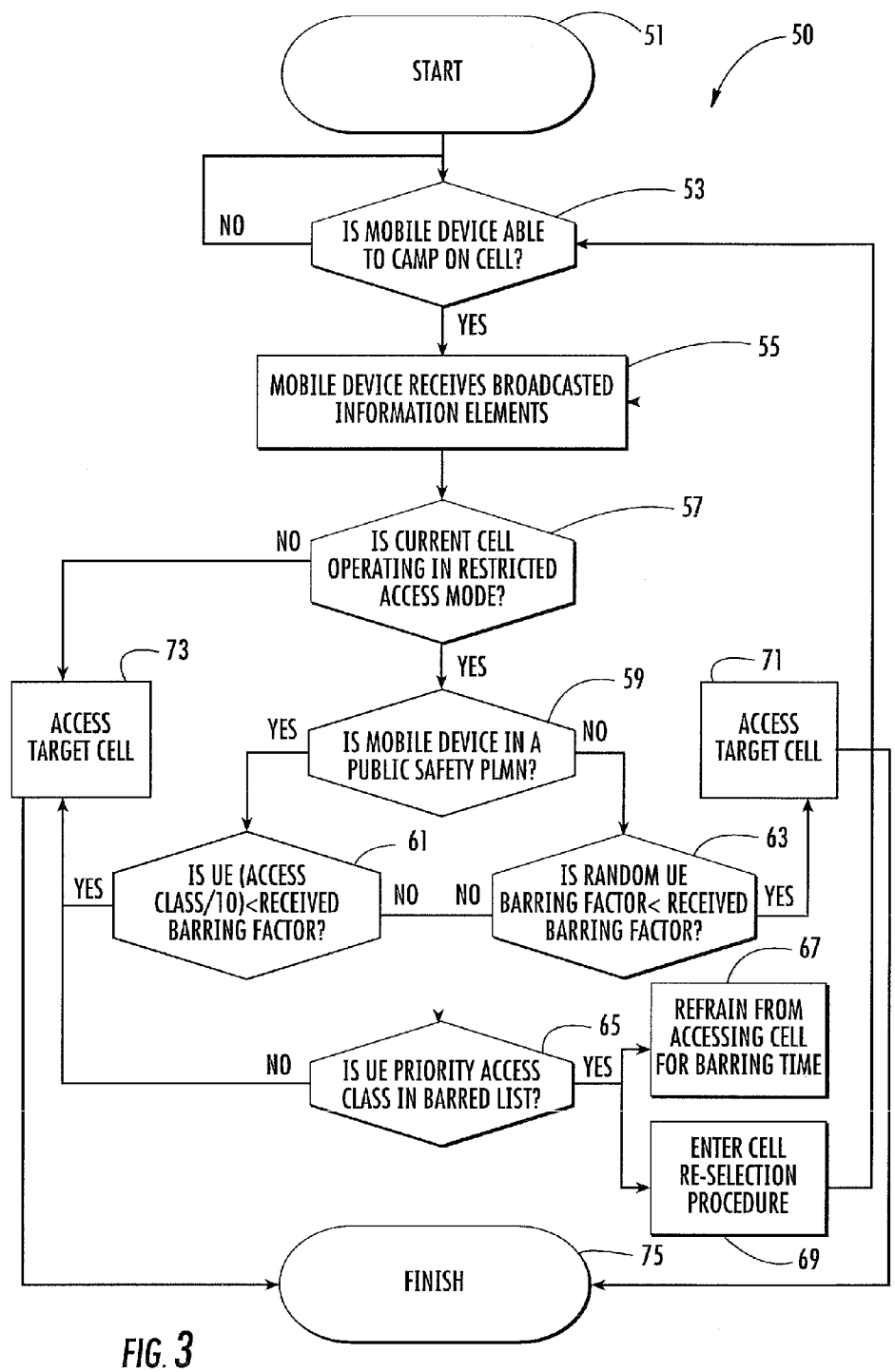
FIG. 3 is a more detailed flowchart illustrating operation of the mobile wireless communications device from the system of FIG. 1.

Referring additionally to FIGS. 2-3 and flowcharts 80, 50 therein, a method of operating the mobile wireless communications device 13 is now described (Blocks 81, 51). The controller 16 is configured to store an assigned AC value in the memory 14 based upon a priority of use characteristic value (Block 83). In particular, the assigned AC value utilizes the typical random ACs of LTE, i.e. AC values 0-9. Advantageously, while typical LTE systems place all public safety devices into AC 14 (Emergency Services), the mobile wireless communications device 13 is able to leverage the already existing ACs 0-9 to provide the desired granularity in the prioritization.

For example, the memory 14 may comprise a portion of a subscriber identification module (SIM) card, and the assigned AC value may be stored therein. The assigned AC value is for use in cooperation with the private LTE base station 11, which is part of a private cellular communication network, such as a public safety communication network or a government metropolitan area network, for example. The controller 16 is configured to store the priority of use characteristic value comprising at least one of a first responder user value or a maintenance user value. In short, the priority of use characteristic value ranks the relative importance of the mobile wireless communications device 13 user to the private cellular communication network's operator. In one exemplary embodiment, the first responder user would have a greater priority than a typical maintenance user.

The assigned AC value may be programmed into the memory 14 of the mobile wireless communications device 13 via multiple methods. One such method may comprise the private cellular communication network's operator pre-programming the assigned AC value into the mobile wireless communications device 13 before issuing the equipment to the user. In another embodiment, the user may subsequently program the assigned AC value into the memory 14 or change the pre-programmed existing value.

For operation on the commercial carrier LTE base station 12, the controller 16 determines and stores a random AC value in the memory 14 (Block 85). In one embodiment, the controller 16 performs a random process to determine the random AC value, and in another embodiment, the commercial carrier LTE base station 12 provides such value, which is received via the LTE transceiver 15.

During operation, the mobile wireless communications device 13 travels through varying geographical areas that may or may not be within the network coverage of the commercial carrier LTE base station 12 and the private LTE base station 11. As an initial matter, the controller 16 determines whether it can camp (connect) onto either the private LTE base station 11 or the commercial carrier LTE base station 12 (Blocks 87, 53). In other words, the controller 16 is configured to determine whether access is available to the private LTE base station 11 or the commercial carrier LTE base station 12. The controller 16 determines this availability of coverage by downloading a received network identification value (e.g. Public Land Mobile Network (PLMN) identification number) from either the private LTE base station 11 or the commercial carrier LTE base station 12 (Block 55) (e.g. in the illustrated embodiment, labeled broadcasted information elements). When either the private LTE base station 11 or the commercial carrier LTE base station 12 is available, as part of the initial cell provisioning process, the mobile wireless communications device 13 determines whether the network operator has engaged the restricted access mode, i.e. utilization of the barring feature (Block 57).

When the private LTE base station 11 is available for access, the controller 16 is configured to then connect thereto based upon the assigned AC value and a private LTE barring value received from the private LTE base station (Blocks 89, 59). The operator of the private LTE wireless communication system determines whether to access the barring feature of LTE and selectively sets the private LTE barring value depending on usage dynamics. In some embodiments, the private LTE base station 11 is configured to set the private LTE barring value based upon a location of the private LTE base station. For example, if an emergency situation has occurred in a section of a city, the operator of the private LTE base station 11 may lower the private LTE barring value transmitted to devices in the area of the emergency, thereby assuring that high priority users, such as first responders and law enforcement, may reliably use the private LTE base station.

When the commercial carrier LTE base station 12 is available for access, the controller 16 is configured to then connect thereto based upon the random AC value and a commercial carrier barring value received from the commercial carrier LTE base station (Block 91). Again, the commercial carrier makes the decision as to whether to utilize the barring feature of LTE. Advantageously, the mobile wireless communications device 13 operates typically during the connection process to the commercial carrier LTE base station 12, but utilizes a special priority connection procedure when connecting to the private LTE base station 11 (Block 93).

More specifically, and depending on which base station is available for access, the controller 16 is configured to generate a comparative barring rate based upon one of the assigned AC value (private LTE base station 11) and the random AC value (commercial carrier LTE base station 12). For example, the controller 16 illustratively divides either the assigned AC value or the random AC value by 10. The controller 16 is configured to then compare the comparative barring rate with one of the private LTE barring value and the commercial carrier barring value (depending on which base station the mobile wireless communications device 13 is trying to connect to) (Blocks 61, 63).

Regardless of which base station the mobile wireless communications device 13 is trying to connect with, the controller 16 is configured to stop connecting to either the private LTE base station 11 or the commercial carrier LTE base station 12 when the comparative barring rate is greater than or equal to the respective private LTE barring value or the commercial carrier barring value. In other words, the mobile wireless communications device 13 is barred from connecting to the respective base station. At Block 65, the controller 16 checks whether the AC value of the mobile wireless communications device 13 is in barred list. If the mobile wireless communications device 13 is barred, the controller 16 is configured to restart connecting to the private LTE base station 11 or the commercial carrier LTE base station 12 after a barring time value has expired (Block 67). In the alternative, the mobile wireless communications device 13 may enter into the cell re-selection procedure, i.e. the controller 16 looks for other base stations to connect to (Block 69).

The controller 16 is configured to continue connecting to the private LTE base station 11 or the commercial carrier LTE base station 12 when the comparative barring rate is less than the respective private LTE barring value and the commercial carrier barring value (Blocks 71, 73, 75). In other words, the mobile wireless communications device 13 user's AC value has not been barred.

In applications where the mobile wireless communications device 13 has access to multiple LTE base stations. In particular, the controller 16 of the mobile wireless communications device 13 may be configured to, when both the private LTE base station 11 and the commercial carrier LTE base station 12 are available for access, then connect to a base station based upon a preferred received network identification value. For example, the controller 16 can store a preferred PLMN ID and connect to the base station associated with the same. In the case of a private user, the mobile wireless communications device 13 would be configured to prefer the private PLMN ID LTE base station 11 when in coverage of both. In the case where the controller 16 is barred from the private LTE base station 11, but had commercial coverage, it would connect to the commercial LTE base station 12.

Advantageously, the mobile wireless communications device 13 is able to operate with either the private LTE base station 11 or the commercial carrier LTE base station 12 with little modification to the typical network infrastructure. Also, the network operator of the private LTE base station 11 may adjust the private LTE barring rate on a site-to-site basis, providing enhanced control to network usage. Additionally, the mobile wireless communications device 13 appears to operate typically to the network infrastructure, thereby maintaining adherence to LTE standards.

Another aspect is directed to a method of operating an LTE mobile wireless communications device 13. The method includes storing an assigned AC value in a memory 14 of the LTE mobile wireless communication device 13 based upon a priority of use characteristic value, storing a random AC value in the memory, and determining whether access is available to a private LTE base station 11 or a commercial carrier LTE base station 12. The method also includes when the private LTE base station 11 is available for access, then connecting thereto based upon the assigned AC value and a private LTE barring value received from the private LTE base station, and when the commercial carrier LTE base station 12 is available for access, then connecting thereto based upon the random AC value and a commercial carrier barring value received from the commercial carrier LTE base station.

Referring now to FIG. 4, a diagram 95 illustrates an example embodiment of the prioritized ACs from the LTE wireless communication system 10. In particular, ACs 11-15 have typical assignments based upon the LTE wireless communications protocol. The random classes of 0-9 have been reassigned to provide a detailed and tiered AC arrangement. In particular, AC0 is assigned to first responders, giving them the highest priority; AC1 is assigned to law enforcement; AC2 is assigned to emergency medical services; AC3 is assigned to municipal command and control; AC4 is assigned to fire prevention; AC5 is assigned to hospital staff; AC6 is not assigned and left open for future expansion; and AC7-9 are assigned to varying levels of public utility workers.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A long term evolution (LTE) wireless communication system comprising:
   a private LTE base station;
   a commercial carrier LTE base station; and
   a mobile wireless communications device comprising an LTE transceiver, a memory, and a controller coupled to said LTE transceiver and said memory and configured to
   store an assigned access class (AC) value in said memory based upon a priority of use characteristic value,
   store a random AC value in said memory,
   determine whether access is available to said private LTE base station or said commercial carrier LTE base station,
   when said private LTE base station is available for access, then connect thereto based upon the assigned AC value and a private LTE barring value received from said private LTE base station, and
   when said commercial carrier LTE base station is available for access, then connect thereto based upon the random AC value and a commercial carrier barring value received from said commercial carrier LTE base station.

2. The LTE wireless communication system of claim 1 wherein said controller is configured to, when both said private LTE base station and said commercial carrier LTE base station are available for access, then connect to a base station based upon a preferred received network identification value.

3. The LTE wireless communication system of claim 1 wherein said controller is configured to:
generate a comparative barring rate based upon one of the assigned AC value and the random AC value; and
compare the comparative barring rate with one of the private LTE barring value and the commercial carrier barring value.

4. The LTE wireless communication system of claim 3 wherein said controller is configured to stop connecting to said private LTE base station when the comparative barring rate is greater than or equal to the respective private LTE barring value; and wherein said controller is configured to stop connecting to said commercial carrier LTE base station when the comparative barring rate is greater than or equal to the commercial carrier barring value.

5. The LTE wireless communication system of claim 4 wherein said controller is configured to restart connecting to said private LTE base station or said commercial carrier LTE base station after a barring time value has expired.

6. The LTE wireless communication system of claim 3 wherein said controller is configured to continue connecting to said private LTE base station or said commercial carrier LTE base station when the comparative barring rate is less than the respective private LTE barring value or the commercial carrier barring value.

7. The LTE wireless communication system of claim 1 wherein said controller is configured to store the priority of use characteristic value comprising at least one of a first responder user value and a maintenance user value.

8. The LTE wireless communication system of claim 1 wherein said controller is configured to receive the random AC value from said commercial carrier LTE base station.

9. The LTE wireless communication system of claim 1 wherein said private LTE base station is configured to set the private LTE barring value based upon a location of said private LTE base station.

10. The LTE wireless communication system of claim 1 wherein said controller is configured to determine availability of access to said private LTE base station or said commercial carrier LTE base station based upon a received network identification value.

11. An long term evolution (LTE) mobile wireless communications device comprising:
an LTE transceiver;
a memory; and
a controller coupled to said LTE transceiver and said memory and configured to
store an assigned access class (AC) value in said memory based upon a priority of use characteristic value,
store a random AC value in said memory,
determine whether access is available to a private LTE base station or a commercial carrier LTE base station,
when the private LTE base station is available for access, then connect thereto based upon the assigned AC value and a private LTE barring value received from the private LTE base station,
when the commercial carrier LTE base station is available for access, then connect thereto based upon the random AC value and a commercial carrier barring value received from the commercial carrier LTE base station, and
when both said private LTE base station and said commercial carrier LTE base station are available for access, then connect to a base station based upon a preferred received network identification value.

12. The LTE mobile wireless communications device of claim 11 wherein said controller is configured to:
generate a comparative barring rate based upon one of the assigned AC value and the random AC value; and
compare the comparative barring rate with one of the private LTE barring value and the commercial carrier barring value.

13. The LTE mobile wireless communications device of claim 12 wherein said controller is configured to stop connecting to the private LTE base station when the comparative barring rate is greater than or equal to the respective private LTE barring value; and wherein said controller is configured to stop connecting to said commercial carrier LTE base station when the comparative barring rate is greater than or equal to the commercial carrier barring value.

14. The LTE mobile wireless communications device of claim 13 wherein said controller is configured to restart connecting to the private LTE base station or the commercial carrier LTE base station after a barring time value has expired.

15. The LTE mobile wireless communications device of claim 12 wherein said controller is configured to continue connecting to the private LTE base station or the commercial carrier LTE base station when the comparative barring rate is less than the respective private LTE barring value or the commercial carrier barring value.

16. The LTE mobile wireless communications device of claim 11 wherein said controller is configured to store the priority of use characteristic value comprising at least one of a first responder user value and a maintenance user value.

17. The LTE mobile wireless communications device of claim 11 wherein said controller is configured to receive the random AC value from the commercial carrier LTE base station.

18. The LTE mobile wireless communications device of claim 11 wherein said controller is configured to determine availability of access to the private LTE base station or the commercial carrier LTE base station based upon a received network identification value.

19. A method of operating a long term evolution (LTE) mobile wireless communications device, the method comprising:
storing an assigned access class (AC) value in a memory of the LTE mobile wireless communication device based upon a priority of use characteristic value;
storing a random AC value in the memory;
determining whether access is available to a private LTE base station or a commercial carrier LTE base station;
when the private LTE base station is available for access, then connecting thereto based upon the assigned AC value and a private LTE barring value received from the private LTE base station; and
when the commercial carrier LTE base station is available for access, then connecting thereto based upon the random AC value and a commercial carrier barring value received from the commercial carrier LTE base station.

20. The method of claim 19 further comprising when both the private LTE base station and the commercial carrier LTE base station are available for access, then connect to a base station based upon a preferred received network identification value.

21. The method of claim 19 further comprising:
generating a comparative barring rate based upon one of the assigned AC value and the random AC value; and comparing the comparative barring rate with one of the private LTE barring value and the commercial carrier barring value.

22. The method of claim 21 further comprising:
stopping connecting to the private LTE base station when the comparative barring rate is greater than or equal to the respective private LTE barring value; and
stopping connecting to the commercial carrier LTE base station when the comparative barring rate is greater than or equal to the commercial carrier barring value.

23. The method of claim 22 further comprising restarting connecting to the private LTE base station or the commercial carrier LTE base station after a barring time value has expired.

24. The method of claim 21 further comprising continuing connecting to the private LTE base station or the commercial carrier LTE base station when the comparative barring rate is less than the respective private LTE barring value or the commercial carrier barring value.

25. The method of claim 19 further comprising storing the priority of use characteristic value comprising at least one of a first responder user value and a maintenance user value.

26. The method of claim 19 further comprising receiving the random AC value from the commercial carrier LTE base station.

27. The method of claim 19 further comprising determining availability of access to the private LTE base station or the commercial carrier LTE base station based upon a received network identification value.

* * * * *